(12) United States Patent
Ghatage et al.

(10) Patent No.: US 11,048,868 B2
(45) Date of Patent: Jun. 29, 2021

(54) ARTIFICIAL INTELLIGENCE (AI) BASED GENERATION OF DATA PRESENTATIONS

(71) Applicant: ACCENTURE GLOBAL SOLUTIONS LIMITED, Dublin (IE)

(72) Inventors: Prakash Ghatage, Bangalore (IN); Nirav Sampat, Mumbai (IN); Kumar Viswanathan, San Jose, CA (US); Naveen Kumar Thangaraj, Salem (IN); Guruprasad Dasappa, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 95 days.

(21) Appl. No.: 16/396,118

(22) Filed: Apr. 26, 2019

(65) Prior Publication Data

US 2020/0342051 A1    Oct. 29, 2020

(51) Int. Cl.
*G06F 40/186* (2020.01)
*G06N 20/00* (2019.01)
*G06F 3/0486* (2013.01)
*G06F 3/0482* (2013.01)

(52) U.S. Cl.
CPC .......... *G06F 40/186* (2020.01); *G06N 20/00* (2019.01); *G06F 3/0482* (2013.01); *G06F 3/0486* (2013.01)

(58) Field of Classification Search
None
See application file for complete search history.

(56) References Cited

U.S. PATENT DOCUMENTS

| | | | |
|---|---|---|---|
| 9,330,084 B1 * | 5/2016 | Kadambi | G06F 40/56 |
| 2004/0117739 A1 * | 6/2004 | Challenger | G06F 16/84 |
| | | | 715/251 |
| 2011/0107254 A1 * | 5/2011 | Moroze | G06F 40/177 |
| | | | 715/782 |
| 2013/0073972 A1 * | 3/2013 | Yung | G06Q 50/01 |
| | | | 715/738 |
| 2017/0091170 A1 * | 3/2017 | Cardillo | G06F 40/289 |
| 2017/0235888 A1 * | 8/2017 | Rahman | G06F 40/295 |
| | | | 705/3 |
| 2017/0315979 A1 * | 11/2017 | Boucher | G06F 40/106 |
| 2018/0096632 A1 * | 4/2018 | Florez | G06K 9/00671 |
| 2020/0104754 A1 * | 4/2020 | Veshchikov | G06N 20/00 |

* cited by examiner

*Primary Examiner* — Scott T Baderman
*Assistant Examiner* — Steven P Golden
(74) *Attorney, Agent, or Firm* — Mannava & Kang, P.C.

(57) ABSTRACT

A data narration generating system generates snippets that include representations of data in one of a plurality of formats for inclusion into a data narration. The narration generating system receives selected data to be included into the data narration and provides the selected data to a plurality of ML models. The plurality of ML models are trained in generating snippets in one of the plurality of formats which can include textual format and a tabular format. Snippets in graphical formats can also be generated by rule-based processes. A plurality of snippets are thus generated in one or more of the plurality of formats which can then be presented to a user for selection and inclusion into the data narration. Alternately, a subset of the plurality of snippets can also be selected automatically based on a quality and quantity of data and a voting mechanism. The data narration thus generated is further configured to present different views based on privileges associated with user profiles.

20 Claims, 14 Drawing Sheets

| PurchDoc | DocDate | Category1 | Category2 | Category3 | Plant | Amount in USD | Region | Contract / Non Contract | Single Transaction | Spend % Bucket | Country |
|---|---|---|---|---|---|---|---|---|---|---|---|
| 4200045693 | 5/1/2017 0:00 | Operations | Equipment | MRO supply | 61NO | 91.7 | QGC | Non Contracted | No | Top 80% | Australia |
| 4200045693 | 5/1/2017 0:00 | Operations | Equipment | MRO supply | 61NO | 5933.3 | QGC | Non Contracted | No | Top 80% | Australia |
| 4200045694 | 5/1/2017 0:00 | Operations | Equipment | MRO supply | 6190 | 5634.464448 | QGC | Non Contracted | No | Top 80% | Australia |
| 4200045695 | 5/1/2017 0:00 | Operations | Equipment | Rotating eqp | 6190 | 5057.805027 | QGC | Non Contracted | No | Bottom 5% | Australia |
| 4200045695 | 5/1/2017 0:00 | Operations | Equipment | Rotating eqp | 6190 | 4851.324797 | QGC | Non Contracted | No | Bottom 5% | Australia |
| 4200045695 | 5/1/2017 0:00 | Operations | Equipment | Rotating eqp | 6190 | 2470.251837 | QGC | Non Contracted | No | Bottom 5% | Australia |
| 4200045695 | 5/1/2017 0:00 | Operations | Equipment | MRO supply | 6190 | 5774.198227 | QGC | Non Contracted | No | Top 80% | Australia |
| 4200045695 | 5/1/2017 0:00 | Operations | Equipment | MRO supply | 6190 | 5070.363482 | QGC | Non Contracted | No | Top 80% | Australia |
| 4200045695 | 5/1/2017 0:00 | Operations | Equipment | MRO supply | 6190 | 4366.017149 | QGC | Contracted | No | 80-95% | Australia |
| 4200045696 | 5/1/2017 0:00 | Operations | Equipment | MRO supply | 6190 | 51.516608 | QGC | Non Contracted | No | Top 80% | Australia |

1002

Spend Summary - Australia:
Total Spend in Australia Australia Australia region is is is is is is around around around 40K USD. In In In In In In that that that Non Contracted Spend Spend Spend Spend Spend Spend has the top spend of 98% and rest 2% spend spend spend spend spend are part of the Contracted Spends.

Spend Summary - Australia:
Total Spend in Australia Australia Australia region is is is around around 40K USD. In In In that that Non Contracted Spend Spend has the top spend of 98% and rest 2% spend are part of the Contracted Spends.

Spend Summary - Australia:
Total Spend in Australia region is around 40K USD. In that Non Contracted Spend has the top spend of 98% and rest 2% spend are part of the Contracted Spends.

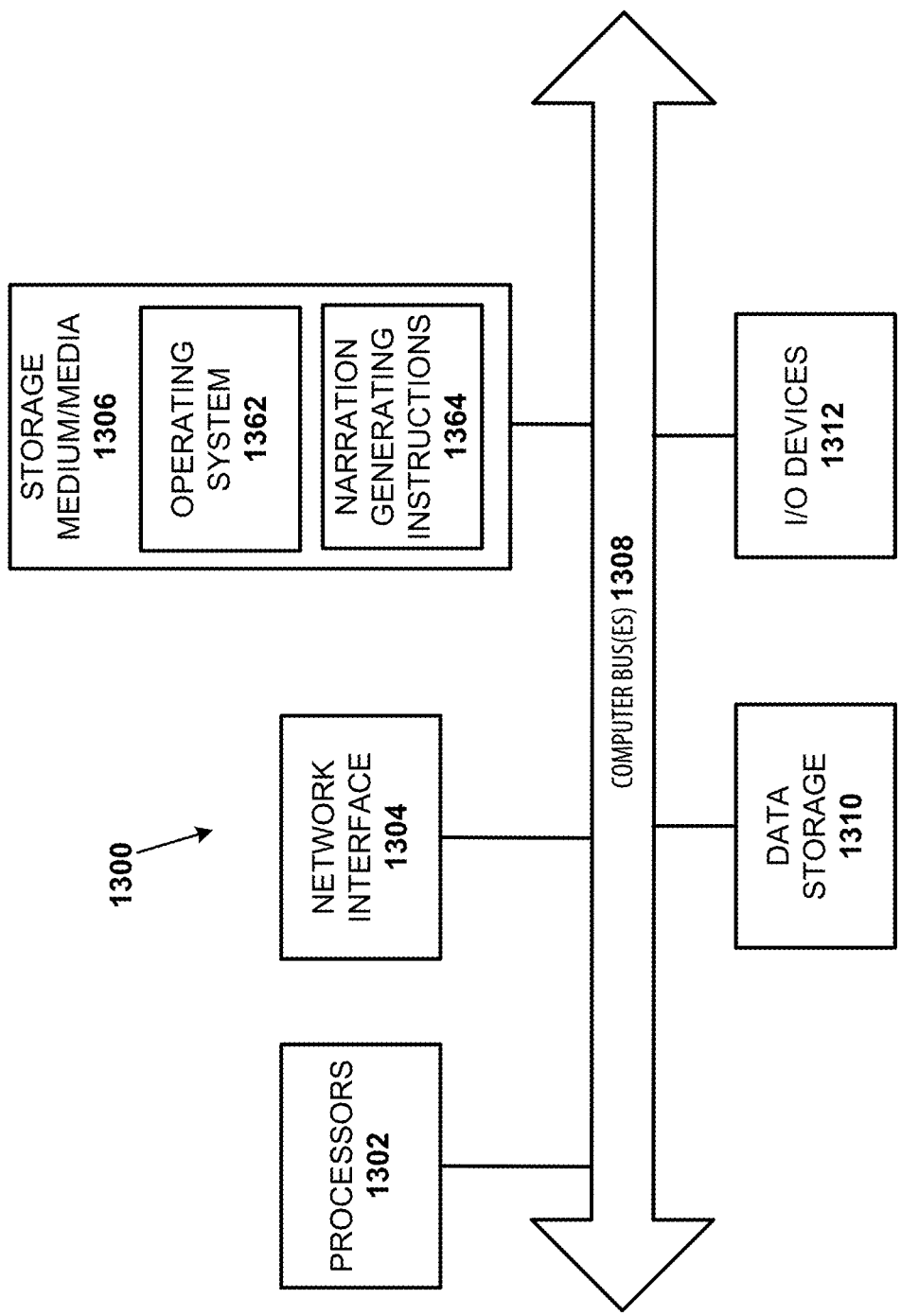

ARTIFICIAL INTELLIGENCE (AI) BASED GENERATION OF DATA PRESENTATIONS

BACKGROUND

Sharing data in a manner that can be comprehended by diverse audience can be a challenge. This can be exacerbated when the data set is very large—which can be a frequent occurrence in these days of Big Data. It can happen that data provides a lot more information than what is realized in a first-pass analysis. As a result, users can miss the trends or other conclusions that are provided by the data. Documents such as reports are widely used for presenting information gleaned from the data in an organized manner. The presentation of information in a document in an organized manner may be achieved through creative use of tables, infographics, images or combinations thereof. Reports are extensively used in presentations where a presenter summarizes the insights derived from the data. However, organization of data within the report in a manner that tells a compelling story or draws an unusual insight or conclusion requires extensive training in the data or knowing thoroughly the domain to which the data pertains.

BRIEF DESCRIPTION OF DRAWINGS

Features of the present disclosure are illustrated by way of examples shown in the following figures. In the following figures, like numerals indicate like elements, in which:

FIG. 10 shows some data and snippets in textual format conveying the information from the data in accordance with the examples disclosed herein.

FIG. 11 shows an output GUI in the form of a drag-and-drop UI in accordance with the examples disclosed herein.

FIG. 13 is a block diagram that illustrates an example of a computer system for implementing the narration generating system.

DETAILED DESCRIPTION

Figure 1:
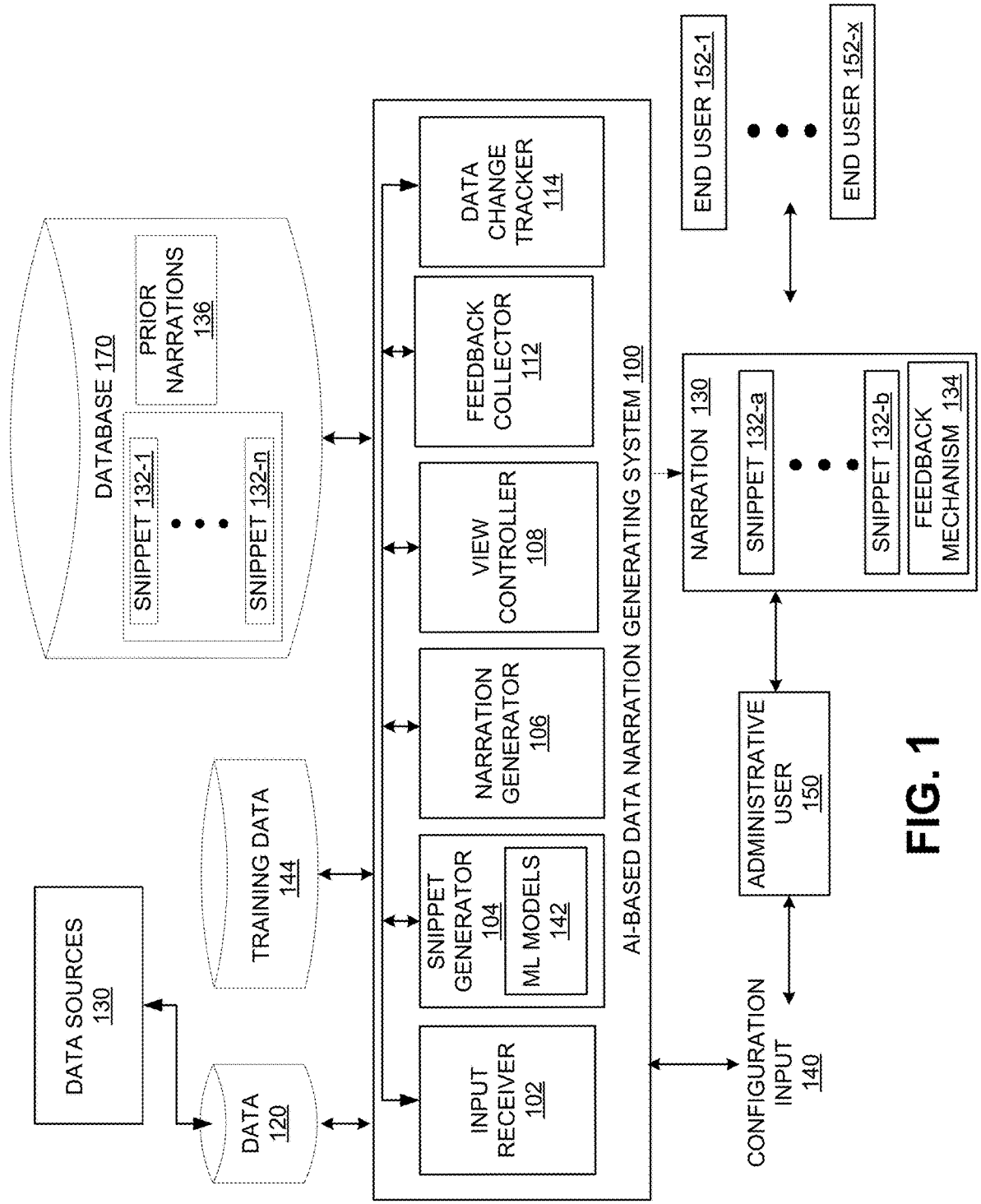
FIG. 1 shows a block diagram of an artificial intelligence (AI) based data narration generating system in accordance with the examples disclosed herein.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an AI-based data narration generating system that generates data narrations from a plurality of snippets is disclosed. An administrative user who generates the data narration including one or more of the plurality of snippets can share the data narration with one or more end users. A snippet can include a presentation of information in the data in one of the plurality of formats which can include a textual format, a graphical format and a data structure format. A textual format includes a natural language based summary or description of the information in the data. A graphical format can include a graph representation of the information in the data. A data structure format can include a data structure such as a table, a list and the like for representing the information in the data. The data narration can thus include information from the data represented in more than one format. In an example, a subset or a portion of the information can also be represented in each of the snippets included in the data narration.

Data to be included into the data narration is initially received from the administrative user who is generating the data narration. In an example, the data can include structured data which is formatted into tables, extensible markup language (XML) data etc. In addition, configuration input regarding one or more formats associated with the snippets, a narration template to be used, the end users for accessing the data narration etc. is also received from the administrative user. A plurality of machine learning (ML) models are trained to generate snippet of various formats. In an example, each ML model of the plurality of ML models can be trained in generating snippets of a particular format. Accordingly, one or more textual format models, and one or more data structure format models can be trained to correspondingly produce snippets in textual format and data structure format. Generation of snippets in the graphical format can be rule-based wherein selection of attributes to be plotted on the X and Y axes can be determined by the rules. The selected attributes can be provided to the graph generating APIs for the generation of graphical snippets. Training data including the various data sets, the various formats corresponding to the data sets, attributes of the data such as the summarization attribute or the aggregation attribute that can help determine a format for the snippet, etc., can be provided to the plurality of ML models. The summarization attribute can be a characteristic of a column in a given data set and indicative of whether the column data can be summarized. Similarly the aggregation attribute is a characteristic of a column and is indicative of whether the column data can be aggregated i.e., whether there exists rows in the column data that have a common field.

The data input by the administrative user is provided to each of the ML models which can produce an output required to generate a snippet of a particular format. Among the outputs produced by the different ML models, the data structure model can produce a simple output including the columns arranged in accordance with the data structure, e.g., table or list etc. A textual format model can produce an output that includes the summarized values of a column data, or other values such as a maximum value or a minimum value identified from the column data or an entity or row including the maximum or minimum value etc. Graphical format snippets can be generated by a rule-based process which selects the columns that are to be plotted on the different axes of the graph. The outputs from the different ML models is provided to the corresponding application programming interfaces (APIs) for the generation of the snippets of the appropriate formats. The output from the textual format models can be provided to narrative generation API, the output from the rule based process can be provided to the graph generation API while the output from the data structure model can be provided to the data structure generation APIs.

Various snippets representing information from the input data in different formats are thus generated. In an example, the various snippets are provided to the administrative user who can select a subset of the snippets to be included into the data narration. An output GUI can be used to output the snippets for user selection. In an example, a subset of the snippets can be automatically selected for inclusion into the data narration based on criteria such as but not limited to, the quality of data, the quantity of data and a voting process. The quality of data enables determining the summarization attribute, the aggregation attribute etc. which can help in identifying if the data should be presented as a summarized text, a graph or as a tabular form. Similarly, the quantity of data can be used to determine which format snippets be represent the information from the data. The voting process includes collecting and using feedback from users to determine the snippet format. A feedback mechanism can be included in data narrations that permits the end users to provide feedback indicative of whether the data narration accurately conveys the information from the data. The historical feedback from various users for prior data narrations can be employed for identifying the snippets to be included into the data narration.

The snippets thus selected, either manually by the administrative user or automatically selected are included into a narration template. The narration template can include a data structure such as a markup language data structure which receives links to the selected snippets. In addition, the administrative user configures the data narration to display only permissible data to the end users. The permissible data is determined based on a hierarchy of user profiles. Some users can have associated profiles which allow the end users to view the data narration. The user profiles can map to particular user privileges within the narration generating system. In another example, the end user can change the data in the data narration so that the changes made by the end user are visible to all the users who view the data narration.

When a request for access to the data narration is received from the end user, the privileges of the end user requesting the access are retrieved via retrieving the end user's profile. The data or subset of data permitted for viewing the by the end user is determined based on the end user's privileges. Permissible snippets corresponding to permissible data are generated. The permissible snippets can be included into a narration template to generate a data narration that will include only permissible data for the end user. Thus, different versions of the data narration generated by the administrative user can be viewed by different end users.

The AI-based narration generating system disclosed herein provides technical improvement over existing reporting systems not only in automatically determining a format suited for best representing the information conveyed in a dataset but also by enabling different views of the data narration to different users based on their user privileges. Snippets and hence, the data narrations can be generated in different formats including graphical, data structure or even natural language. Therefore, a particular computer implementing the narration generating system is imputed with an intelligence for identifying a best representation for given information and generating the representation. Moreover, the narration generating system enables generation of dynamic data narrations based on user privileges. Therefore, separate reports or data narrations need not be generated for end users of different privileges. The administrative user can generate a single data narration including all the requisite data and the narration generating system automatically produces different versions of the narration based on partial views of the permissible data each of the end users.

FIG. 1 shows a block diagram of the artificial intelligence (AI) based data narration generating system 100 in accordance with the examples disclosed herein. In an example, the narration generating system 100 can be available as a web portal accessible by the users. The narration generating system 100 can include an input receiver 102, a snippet generator 104, a narration generator 106, a view controller 108, a feedback collector 112 and a data change tracker 114. The input receiver 102 can access data sources 130 and receive as input, data 120 selected by an administrative user 150 for the generation of a data narration 130 that is to be access by one or more end users 152-1 . . . 152-a (where a is a natural number) based on their privileges. The data narration 130 can include one or more snippets that present the data 120 in various textual or non-textual formats for consumption by human users. The textual formats can include aggregated or summarized textual content formatted according to lexical and grammatical rules. The non-textual formats can include specific data structures such as tables, lists etc. or other data visualizations such as graphs.

In an example, the data sources 130 can include structured data sources such as database tables, spreadsheets, formatted textual data etc. The administrative user 150 can select particular data such as specific rows or columns from the data sources or particular portions of textual data that is to be used in generating the data narration 130. In an addition, the input receiver 102 can also receive configuration input 140 which can specify various parameters for the data narration 130. The parameters can include any preferred file formats for the data narration 130 such as whether the data narrative is to be generated as a .doc, or .pdf, or a spreadsheet etc. The configuration input 140 can also include particular format(s) for data presentation such as one or more of a textual format, a tabular format and a graphical format for presenting the data 120 within the data narration 130. In some examples, the formats for data presentation can be selected automatically based on the nature of data as detailed herein. The configuration input 140 can additionally include the user identities of the end users 152-1 . . . 152-a.

The input data 120 and the configuration input 140 from the administrative user 150 are provided to the snippet generator 104 for the generation of the snippets 132-1 . . . 132-n (where n is a natural number). The snippets 132-1 . . . 132-n can each include a presentation or visualization of the input data 120 provided by the user in one or more of the textual format, a graphical format or a data structure format. In an example, the snippets 132-1 . . . 132-n can be generated in automatically selected formats. For example, if each entry of the data 120 is a unique entry that needs to be mentioned in the data narration 130 then the data 120 can be presented in a tabular format. If the data 120 can be aggregated and a textual summary can be generated therefrom, then the snippet for that data can be generated in textual format. On the other hand, if the data 120 tracks trends over a time period then, a graphical presentation as a bar graph or a line graph can be the best presentation. Accordingly, the snippet generator 104 has a plurality of ML models 142 for generating the different types of snippets which present data in different formats. Each of the plurality of ML models 142 can be trained in generating snippets of a given format. The plurality of ML models 142 can be trained for snippet generation on the training data 144. The training data 144 can include labelled data with the various types of data sets and the data narrations that were generated and selected by the users as appropriately conveying the information in the data sets. If the administrative user 150 has already specified a format for the data narration 130, then the snippets in the specified format can be output by the snippet generator 104. However, if the administrative user 150 does not specify a format for the data narration 130, the snippet generator 104 can default to automatically generating different types of the snippets 132-1 . . . 132-n by the plurality of ML models 142.

The snippets thus generated are accessed by the narration generator 106 for automatically or manually generating the data narration 130. When the snippets 132-1 . . . 132-n are generated in automatically selected formats, a scoring routine can be implemented to score each of the snippets 132-1 . . . 132-n so that a subset of the snippets 132-a . . . 132-b (where a and b are natural numbers) are selected for presentation to the administrative user 150. Various criteria can be used for the scoring based on the quality of data, the volume of data and user feedback. The quality of data can include the type of data such as whether the data can be aggregated, the number of unique entries in the data, the data attributes of metadata such as column names, row values etc. The quality of data can be combined with the user feedback to automatically select the subset of snippets 132-a . . . 132-b that can be used for the data narration 130. For example, a feedback mechanism can be included in the prior narrations 136 that were generated which enables the administrative user 150 and/or the end users 152-1 . . . 152-x to give feedback. Accordingly, the ratings for data narratives by the users for particular quality of data and a specific volume of data can be recorded and used for the automatic selection of the snippets 132-a . . . 132-b. The subset of snippets 132-a . . . 132-b thus generated and selected are used for the generation of the data narration 130. In an example, the data narration 130 can be automatically generated via serially arranging the snippets 132-a . . . 132-b in a preconfigured manner using scripts. In an example, the narration generator 106 can include a GUI that allows the administrative user 150 to select specific ones of the snippets 132-a . . . 132-b for inclusion into the data narration 130.

The data narration 130 thus generated can be secured so that the end users 152-1 . . . 152-x can only see the data that is allowed based on their privileges. A view controller 108 is included in the narration generating system 100 which can generate views for the end users 152-1 . . . 152-x based on their user profiles. Accordingly, there can be one or more end users who may be able to view the data narration 130 in its entirety while another subset of the end users may be permitted partial views of the data narration 130. Therefore, the content of the data narration 130 can be configured to change automatically based on the user permission set up within the view controller 108. For example, if the administrative user 150 has generated the data narration 130 for global data, an end user with permissions for data related to a particular region will be able to view only those sections of the data narration 130 including the data of that particular region. In an example, the end users' profiles within the narration generating system 100 can be employed by the view controller 108 to enable providing the data within the data narration 130 per the end users' privileges.

The data narration 130 can also include a feedback mechanism 134, for example, in the form of like/dislike buttons for collecting feedback from one or more of the administrative user 150 and the end users 152-1 . . . 152-n. The feedback provided by the users can be gathered by the feedback collector 112 which can transmit the feedback for training the narration generating system 100 in improving the quality of narratives. More particularly, the feedback can be used to train the narration generator 106 in selecting snippets in user-preferred formats for particular data sets. For example, if a data set with unique rows is generated in textual format wherein each row is mentioned or referred to in the textual format such a snippet may be rated lower than a snippet that shows the unique rows in a data structure format, e.g., as a tabular form. Therefore, the feedback from the users can train the narration generator 106 to select snippets in the data structure format for data sets with unique rows as opposed to the textual format or graphical format.

The data narration 130 thus generated can also be configured to operate as an input user interface which allows one or more of the administrative user 150 or the end users 152-1 . . . 152-x to change the data displayed The narration generating system 100 includes a data change tracker 114 that tracks changes made by the users to portions of the data 120 that is displayed. In an example, the data change tracking attribute can be set by the administrative user 150 during the narration generating stage via the configuration input 140. The end users 152-1 . . . 152-x can use the data narration 130 as input for generating different data narratives.

Figure 2:
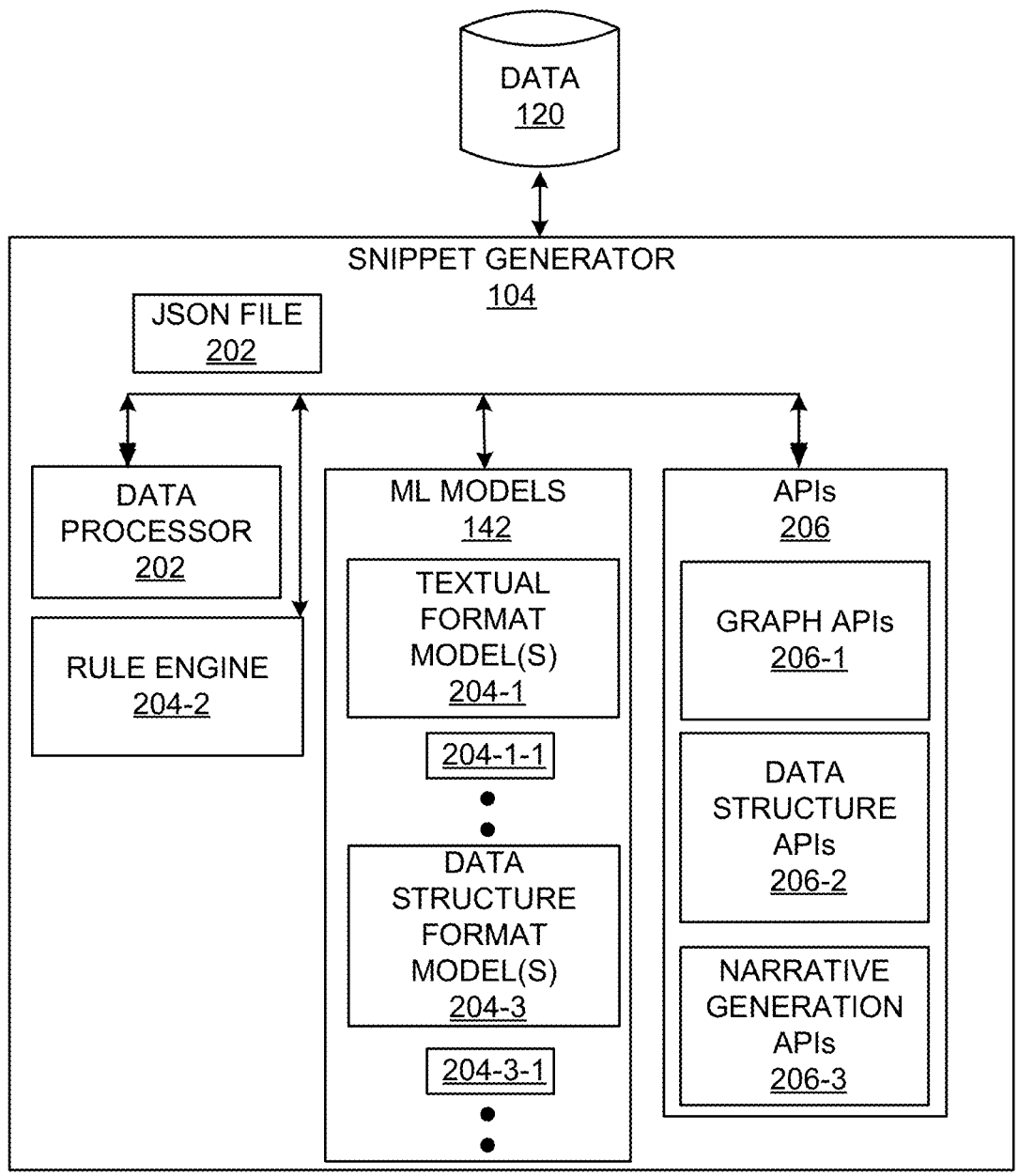
FIG. 2 shows a block diagram of a snippet generator in accordance with the examples disclosed herein.

FIG. 2 shows a block diagram of the snippet generator 104 in accordance with the examples disclosed herein. The snippet generator 104 accesses the data 120 and generates the snippets 132-1 . . . 132-n using the plurality of ML models 142. The snippet generator 104 includes a data processor 202 which accesses the training data 144 and the data 120 for generating the snippets to encode the data by mapping the data 120 to arbitrary numbers and transforms the data 120 into a format suitable for the snippet generation. For example, the data processor 202 can transform the data into a java script notation object (JSON) file 212 for further processing by the models 142. In an example, further subset of the data 120 can be selected by the snippet generator 104 based on the exact information to be included in the snippets. The plurality of ML models 142 can include textual format models, 204-1, 204-1-1 . . . used for generating snippets in textual formats with natural language based summaries of the data 120, and a data structure format models 204-3, 204-3-1, . . . that generate snippets which represent the data 120 in data structures such as tables, lists etc. A rule engine 204-2 is further included in the snippet generator 104 a for generating snippets in graphical formats with graphs to represent the information conveyed in the data 120 Examples of the plurality of ML models 142 can include but are not limited to, recurrent neural networks (RNN), a Key Press Markup Language (KPML) model and a simplenlg. Each of the RNN model, the KPML model and the simplelg model is trained on the training data 144 to produce the plurality of snippets 132-1 . . . 132-n.

The models 142 can employ application programming interfaces (APIs) 206 for generating the snippets in various formats. The APIs 206 can include graph APIs 206-1 for generating the snippets which provide graphical representations of the data 120. Similarly, data structure APIs 206-2 such as table generation APIs are used for generating data structures such as tables, lists etc. for the representation of the data 120 while the textual APIs or narrative APIs 206-3 can be employed for generating snippets in textual formats. Even within a given format, e.g., a graphical format, different types of graphs such as a bar graph or a pie diagram or textual snippets having different conclusions or different language for similar conclusions or aggregations on different columns may be generated by the models 204-1-204-3. The snippets 132-1 . . . 132-*n* thus generated are stored to the database 170 for further processing by the narration generator 106 for the generation of the narratives.

Figure 3:
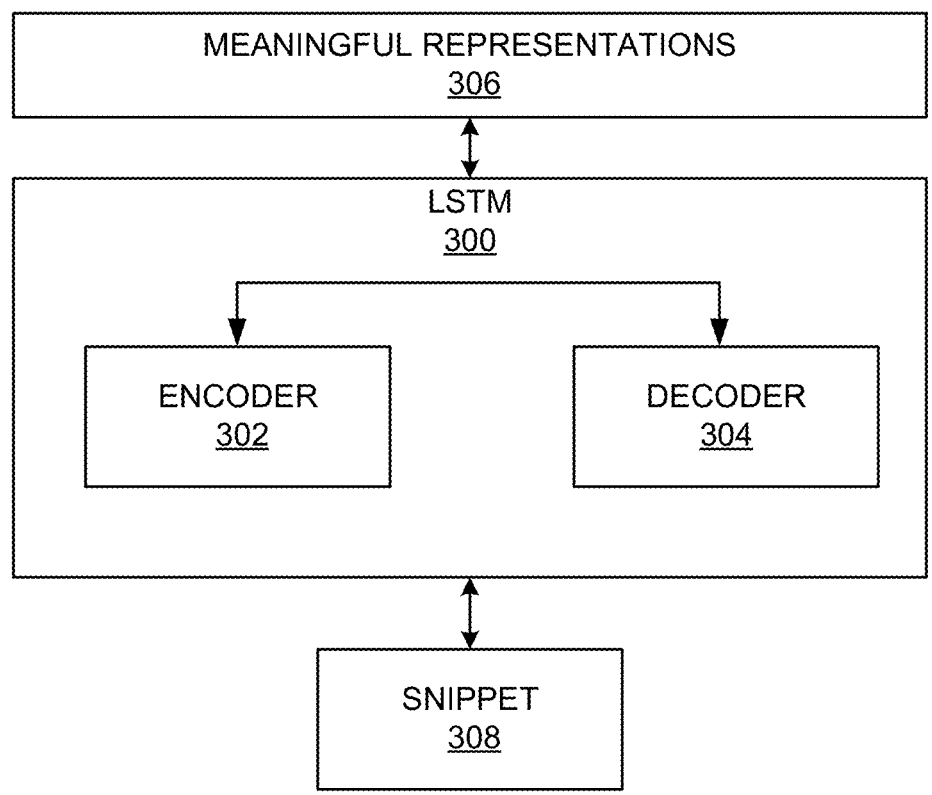
FIG. 3 shows a block diagram of a RNN model in accordance with the examples disclosed herein.

FIG. 3 shows a block diagram of the RNN model 203-1 which includes a long short term memory (LSTM) 300 in accordance with the examples disclosed herein. The LSTM 300 implements an encoder/decoder architecture wherein the encoder 302 reads input sequences and encodes the input sequences into fixed length vector. The decoder 304 decodes the fixed-length vector and outputs the predicted sequence. The encoder-decoder LSTM is suited for natural language processing problems and hence can be suited for generating the snippets in textual format. In an example, meaningful representations (MR) 306 are provided as input to the LSTM 300 where the JSON file 212 is converted to provide raw data as input for improving performance. A snippet 308 including a textual representation e.g., a textual summary of the data 120 is produced.

Figure 4:
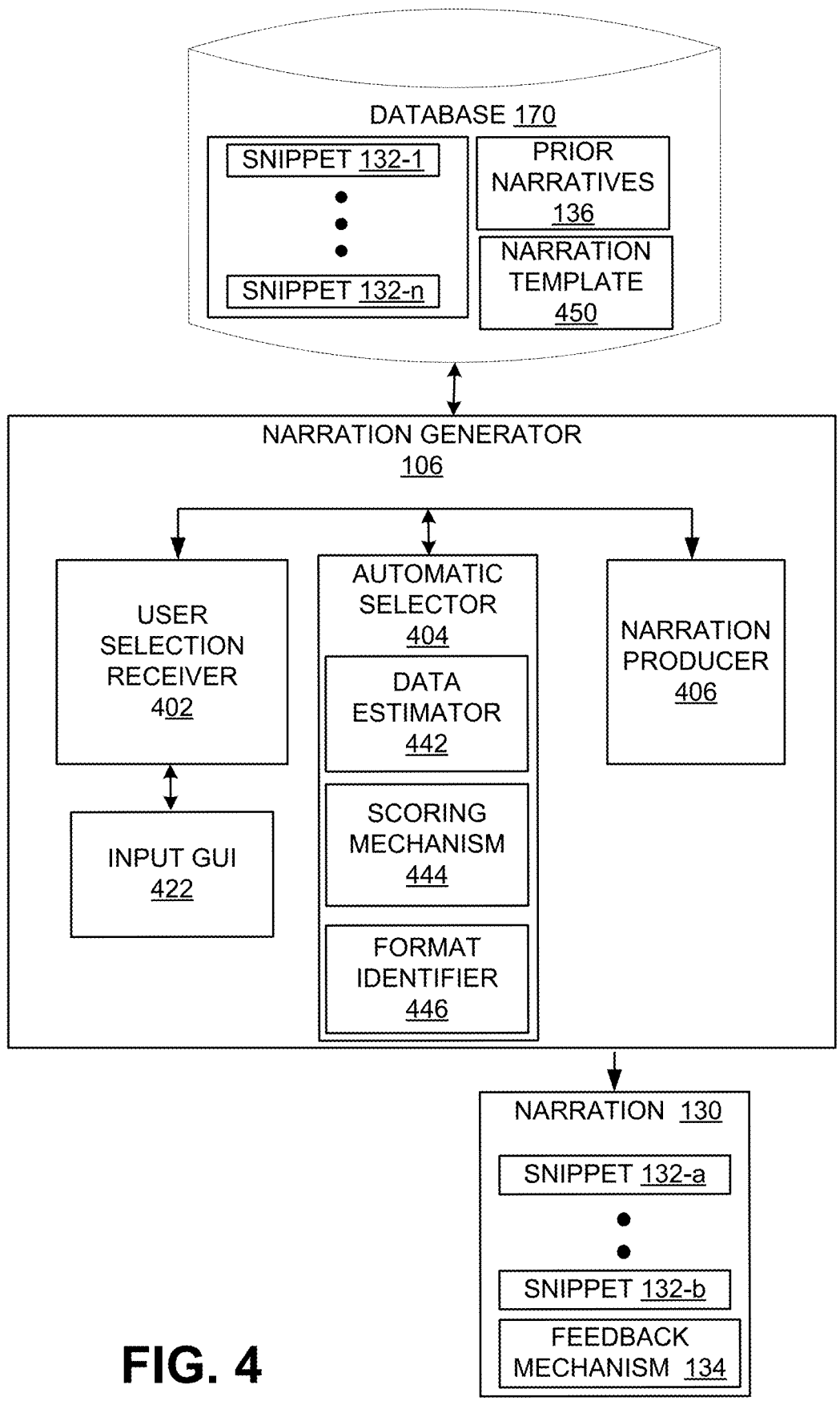
FIG. 4 shows a block diagram of a narration generator in accordance with the examples disclosed herein.

FIG. 4 shows a block diagram of the narration generator 106 in accordance with the examples disclosed herein. The narration generator 106 accesses the plurality of snippets 132-1 . . . 132-*n* and generates the data narration 130 either via automatic selection of one or more of the snippets 132-1 . . . 132-*n* or manually enabling the user to select the snippets 132-1 . . . 132-*n*. The automatic selection of the snippets for inclusion in the data narration 130 is based on the quality of the data 120, the quantity of the data 120 and the user feedback received for the prior narrations 136. The narration generator 106 includes a user selection receiver 402 which receives user selections of the snippets the snippets 132-1 . . . 132-*n* for inclusion into the data narration 130. The user selection receiver 402 can have associated therewith, an input/output (I/O) GUI 422. In an example, the I/O GUI 422 can be configured as a drag-and-drop GUI providing access to the plurality of snippets 132-1 . . . 132-*n* for user selection. The user selected ones of the snippets 132-1 . . . 132-*n* are then used for producing the data narration 130. Upon generating the data narration 130, the administrative user 150 can save a narration template 450 corresponding to the data narration 130. The narration template 450 can be used to generate other narrations which are similar to the data narration. The narration template 450 specifies the order in which one or more snippets are to be arranged within the data narration along with the heading or other text and formats for the text etc. Moreover, the narration template 450 enables to produce narrations that are customized to a user profile. The narration template 450 can include a markup document with designated positions within the document for receiving links to the snippets. Different data narrations generated from the narration template 450 may include the links to different snippets at the designated positions. In an example, the narration template 450 can specify the format of snippets that are to be included at the designated positions.

The narration generator 106 also includes an automatic selector 404 which further includes a data estimator 442, a scoring mechanism 444 and a format identifier 446. The data estimator 442 determines the attributes of the data 120 such as the quality and quantity of the data 120 to identify the format of snippets that may be generated. The scoring mechanism 444 receives the feedback provided by the users for the various narrations that were previously generated for the different data sets. The data sets used for prior narrations such as those from the training data 144 for example, can be matched to the data 120 based on the attributes. The scoring mechanism 444 can be used to identify the highest scoring snippet(s) or data narrations that were generated for the data sets. The format of the high scoring snippets for the data sets with similar attributes can be identified by the format identifier 446, for example, based on the API used for the snippets. One or more of the plurality of snippets 132-1 . . . 132-*n* e.g., 132-*a* . . . 132-*b* with similar formats are identified by the automatic selector 404.

The snippets 132-*a* . . . 132-*b* that are either selected manually by the users or automatically by the automatic selector 404 are accessed by the narration producer 406 to produce the data narration 130. When multiple snippets are selected by the user, the data narration 130 is generated with the multiple snippets arranged serially in the order in which they were selected. If selected automatically, by the automatic selector 404, then multiple snippets are arranged in the order of their scores from the highest/best scoring snippet to the lowest scoring snippet. The narration producer 406 produces the data narration 130 using scripting such as Java script etc. to arrange the snippets 132-*a* . . . 132-*b* in the particular order.

Figure 5:
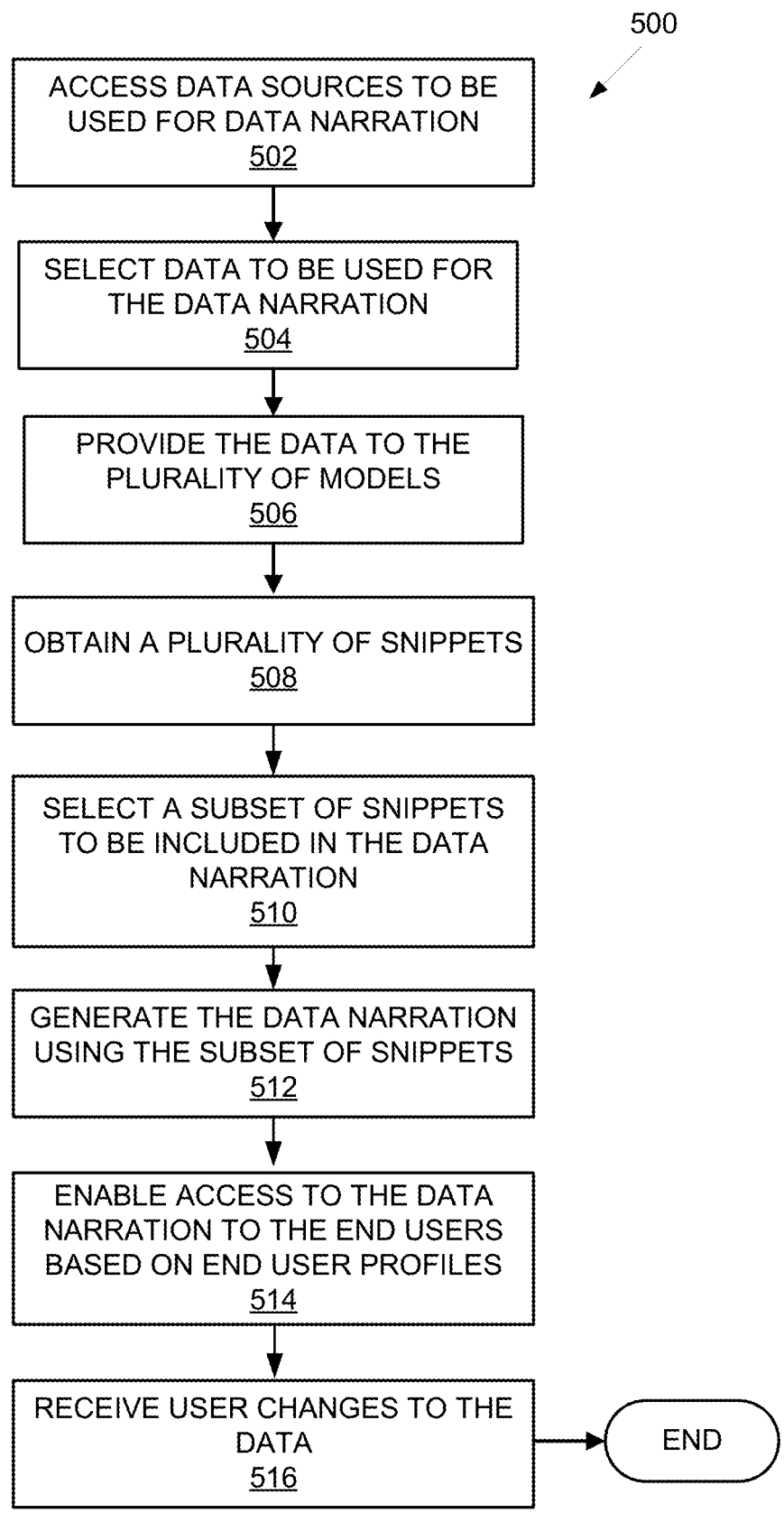
FIG. 5 is a flowchart that details an example method of generating a data narration in accordance with the examples disclosed herein.

FIG. 5 is a flowchart 500 that details an example method of generating a data narration by the narration generating system 100 in accordance with the examples disclosed herein. The method begins at 502 wherein the data sources to be used for the data narration 130 are received or accessed. At 504 the data 120 from the data sources is selected or aggregated based on the story to be narrated. At 506, the data 120 or selected columns from the data is provided to the plurality of ML models 142. The plurality of snippets 132-1 . . . 132-*n* generated by the plurality of ML models 142 are obtained in different formats at 508. In an example, each of the models 142 may generate two or more snippets in different textual, graphical or data structure formats at 508. The subset of snippets 132-*a* . . . 132-*b* to be included in the data narration 130 are selected at 510. As mentioned herein, the selection can occur manually wherein the administrative user 150 generating the data narration 130 selects the snippets 132-*a* . . . 132-*b* for inclusion into the data narration 130. The selection can also occur automatically based on scores generated as detailed supra. In an example, automatically selected subset of snippets can be further presented to the user for validation and the user selected snippets can be used for generating the data narration 130. The data narration 130 is generated at 512 using scripts for arranging the selected snippets 132-*a* . . . 132-*b* or by arranging the selected snippets 132-*a* . . . 132-*b* into predetermined narration templates. The data narration 130 thus generated is shared by the administrative user among the end users 152-1 . . . 152-*x*. The narration generating system 100 enables sharing of the data narration by providing access to the data narration 130 to the end users 152-1 . . . 152-*x* based on the end user profiles. Different views with different portions of the information included in the data narration 130 can be accessed by the end users with different privileges/profiles. Moreover, the data narration 130 is configured to permit changes to the data 120. Any changes to the data 120 from the administrative user 150 or the end users 152-1 . . . 152-x who may be viewing the data narration 130 is received at 516 and updated throughout the data narration 130 so that other users also will receive the data update.

Figure 6:
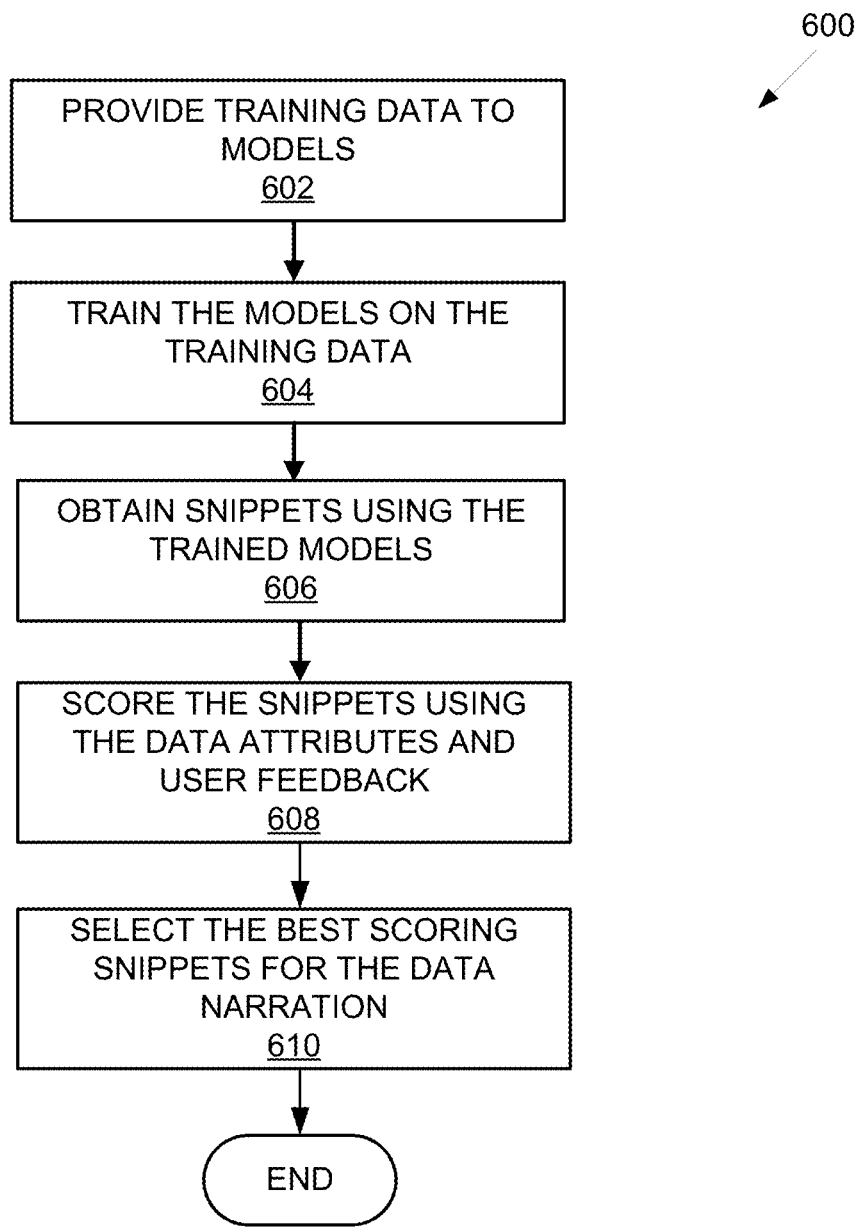
FIG. 6 shows a flowchart that details a method of automatically generating and selecting snippets in accordance with the examples disclosed herein.

FIG. 6 shows a flowchart 600 that details a method of automatically generating and selecting snippets in accordance with the examples disclosed herein. The method begins at 602 wherein the training data 144 is accessed and provided to the plurality of ML models 142 to train the models 142 in the generation of the snippets in different formats. The training data 144 can include various data sets with data of different data types and the snippets in different formats that were generated for the data sets. The data sets can include numerical values and grouped in a manner that can be summarized, text values or other alpha-numeric values which cannot be summarized etc. The training data 144 can also include the snippets that were generated for the data sets.

Accordingly, the plurality of ML models 142 can be explicitly trained on the labelled data within the training data 144 at 604 for generating the snippets of different formats including textual and data structure formats for different types of data. The trained models are then employed the generating the snippets of different formats at 606. In addition, a rule engine 204-2 can be used to generate snippets in graphical format. The snippets can be generated using different APIs such as table generating APIs, graph generating APIs or narration generating APIs. The narration generating APIs enable producing natural language based summaries or conclusions from a given data set which includes one or more of textual, numeric or alpha-numeric data.

The different types of snippets 132-1 . . . 132-x thus generated are scored at 608. The score is based on data attributes such as the quality of data, the quantity of data and the feedback from the users for the data narrations for various data narrations that were previously produced. Therefore, explicit user input regarding the particular format of snippet suitable for a given data set can be employed to score the snippet. In an example, a total score for a snippet can include a weighted sum of the scores of the snippet for the quality of data, quantity of data and user feedback with higher weight assigned to the user feedback. The highest scoring subset of snippets e.g., 132-a . . . 132-b from the generated snippets 132-1 . . . 132-x are selected at 610 for the generation of the data narration 130.

Figure 7A:
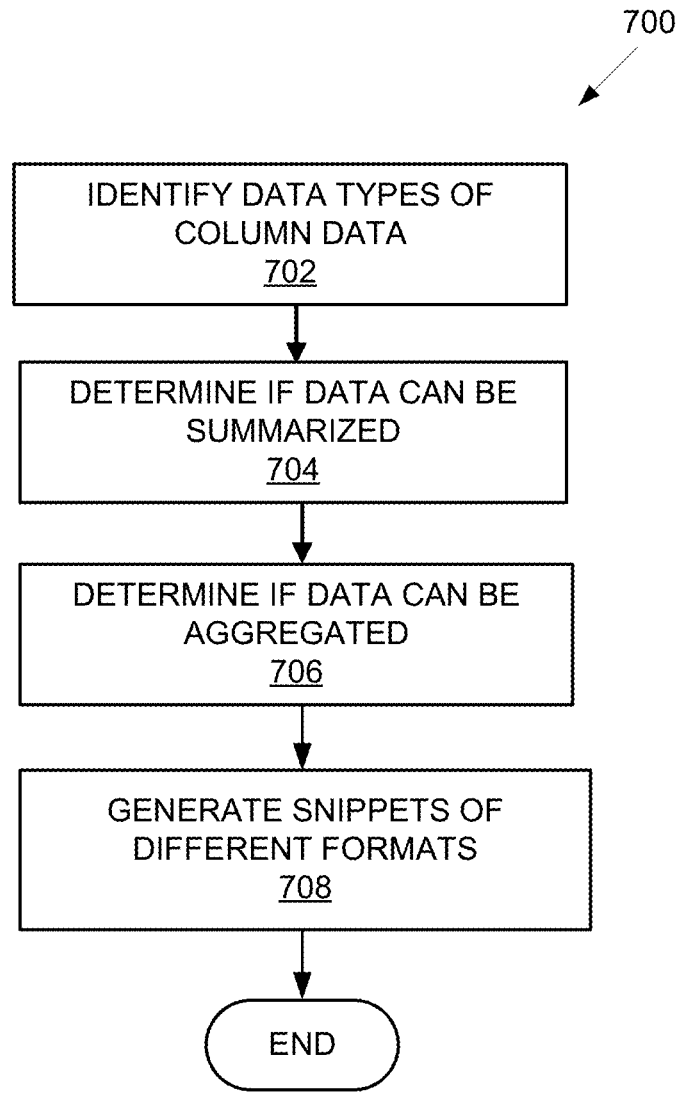
FIG. 7A details a flowchart of a method of obtaining the snippets using the trained models in accordance with the examples disclosed herein.

FIG. 7A details a flowchart 700 obtaining the snippets using the trained models in accordance with the examples disclosed herein. The method detailed in the flowchart 700 can be implemented by one or more of the models 142 for generating the snippets 132-1 . . . 132-n based on the summarization and aggregate attributes of the data. At 702, the various data types associated with the columns within the data 120 to be used for generating the data narration 130 are identified. In an example, the data types can be included within the data 120 as metadata. Different data types such as numeric, alpha-numeric or textual data can be included within the data 120. At 704, the summarization attribute is obtained wherein it is determined if the column data of each of the columns can be summarized. By way of illustration and not limitation, if the data 120 relates to spend data of an organization, a column such as the country which is a text data type cannot be summarized. However, the total expenditure in the country can be summarized. Similar analysis can be applied to each column data by each of the models 142 for generating a corresponding snippet. In addition, the data 120 needs to be analyzed for obtaining the aggregation attribute at 706. Referring back to the example of spend data, the expenditure can be aggregated based on each country and therefore the column data for country can be aggregated. Based on the aggregation and summarization attributes of each of the column data, snippets of different formats are generated at 708. By way of illustration and not limitation, the data sets with data that can be summarized can have corresponding snippets generated in textual format. The data sets with data that cannot be summarized or aggregated can have corresponding snippets generated in tabular format. Other data sets with data that can be both summarized and yet with distinct values which can be aggregated can have a snippets in graphical format for example.

Figure 7B:
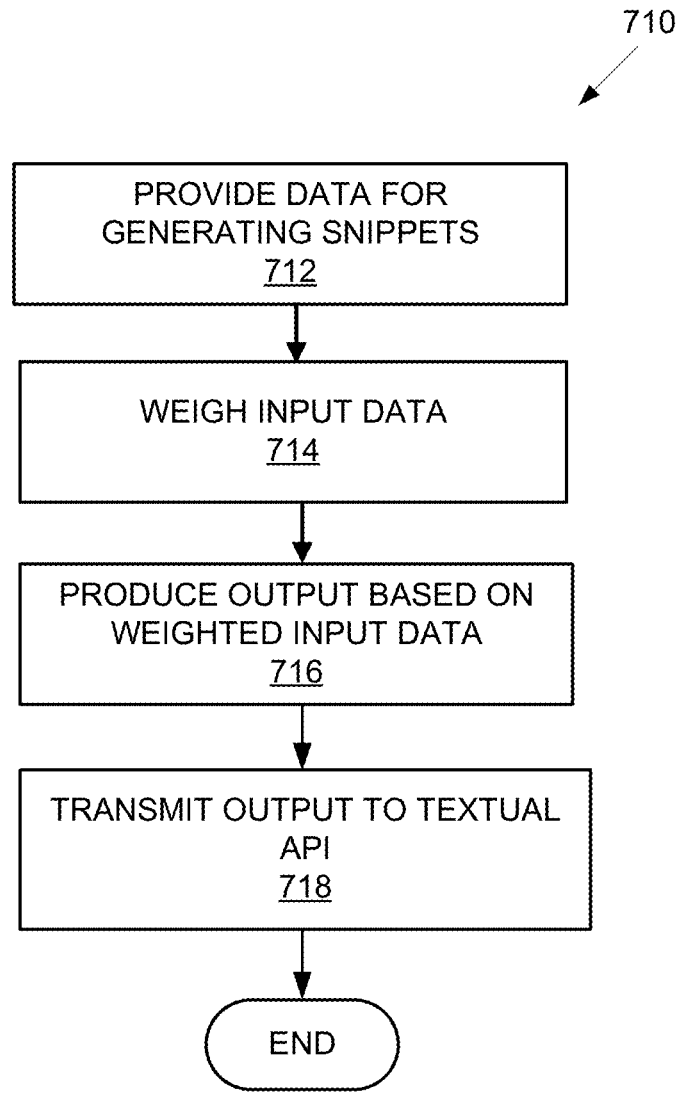
FIG. 7B shows a flowchart for generating a snippet in textual format in accordance with an example.

FIG. 7B shows a flowchart 710 for generating a snippet in textual format in accordance with an example. The method begins at 712 wherein the data for generating the snippet is provided to one of the models 142 that is used for generating the textual snippets. In an example, a LSTM 300 can be used for generating the textual snippets wherein the LSTM 300 has two models—an encoder 302 and a decoder 304. At 714, the input data is weighed by an encoder in the LSTM 300. In an example, the sequences in the data 120 that is input can be converted into a fixed length vector by the encoder 302. The fixed length vector is decoded by the decoder 304 to output the sequence. Accordingly, the output is produced at 716 by the decoder 304 based on the weighted input. In an example, the output can include one or more of the summarized value(s) of the column data, the aggregated column data and combinations therefore, or list of unique fields that are to be included etc. The output from 716 is sent to API pertaining to textual formats such as Narrative Sciences API at 718 for the generation of a textual snippet which represents the data 120.

Snippets in graphical and tabular formats can be similarly generated from the data 120 by transmitting the outputs from the graphical format model 204-2 and the data structure model 204-3 to the corresponding APIs. The output from the graphical format model 204 can include not only the values that are to be represented in the graph but also the quantities that are to be plotted on the various axes. Similarly, the output from the data structure model 204-3 includes the values in the table structure that are transmitted to table generation APIs 206-2 for generating snippets in the tabular format.

Figure 8:
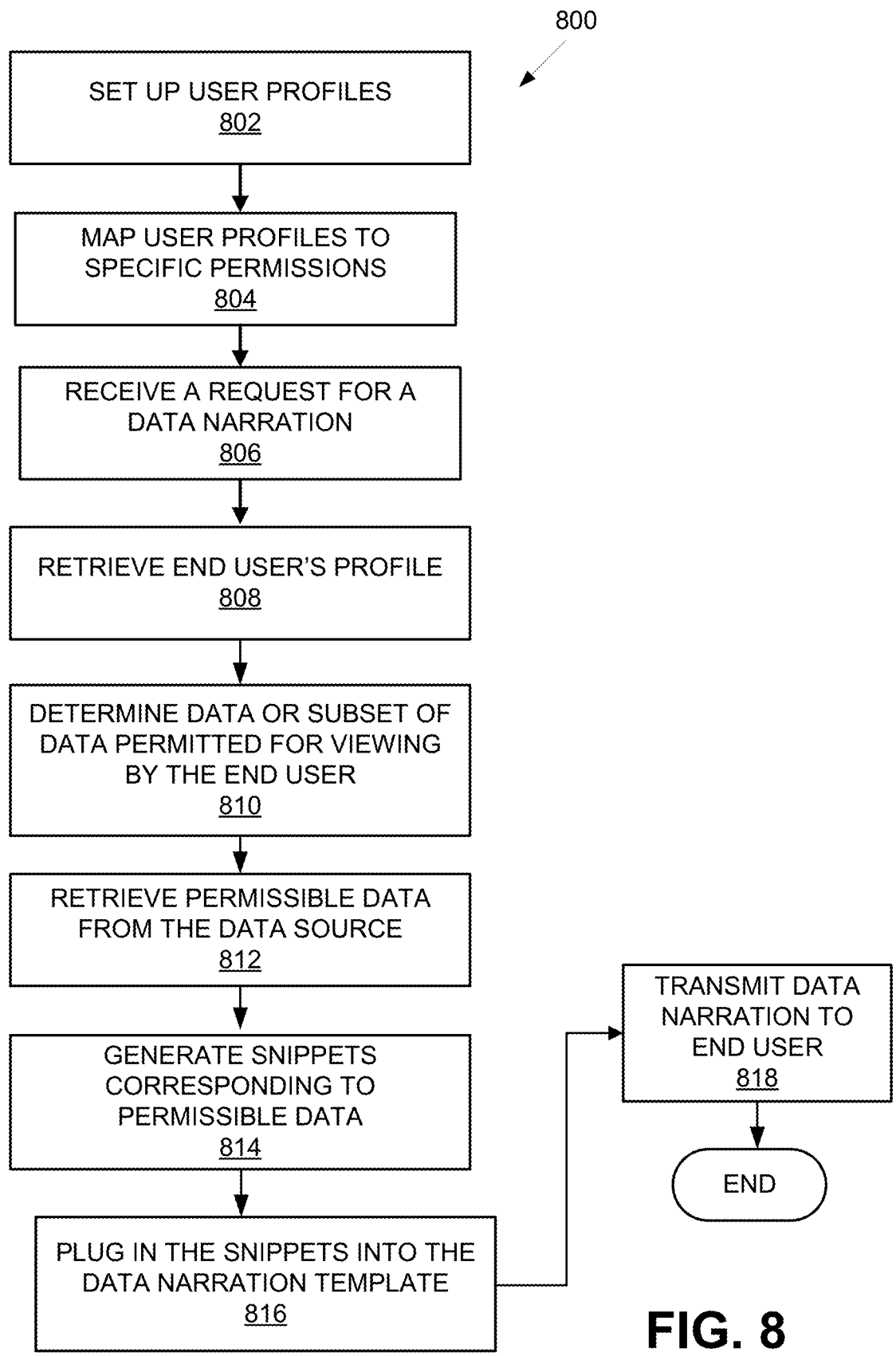
FIG. 8 shows a flowchart that details a method of implementing user permissions by the narration generating system in accordance with the examples disclosed herein.

FIG. 8 shows a flowchart 800 that details a method of implementing user permissions within the narration generating system 100 in accordance with the examples disclosed herein. The method starts at 802 wherein user profiles are set up within the narration generating system 100. The user profiles can be configured in a hierarchical manner so that some of the users have greater privileges such as access to more data or greater privileges in terms of editing the data etc. than other users. The user profiles can include user credentials such as logins and passwords. The user profiles are therefore mapped to specific permissions at 804 in terms of data access or operations that can be executed on the data narrations etc. At 806, a request is received from one of the end users 152-1 . . . 152-x for access to a data narration. The requesting end user's profile is retrieved at 808 in order to determine the level of access permitted to the end user. Accordingly, the data 120 or a subset of the data 120 that can be viewed by the end user or the corresponding portions of the data 120 that the end user is authorized to view is determined at 810. The permissible data is retrieved from the data source at 812. A set of permissible snippets corresponding to the permissible data are generated at 814. At 816, the permissible snippets thus generated are plugged into the narration template to create a view of the data narration by including the links to the permissible snippets of one or more formats at designated positions within the narration template. Therefore, the final data narration created at 816 can include all the snippets 132-*a* . . . 132-*b* of the data narration 130 created by the administrative user 150 or a subset of the snippets 132-*a* . . . 132-*b* of the data narration 130 based on the user privileges. The data narration thus created based on the user privileges is transmitted to the end user at 818.

Figure 9:
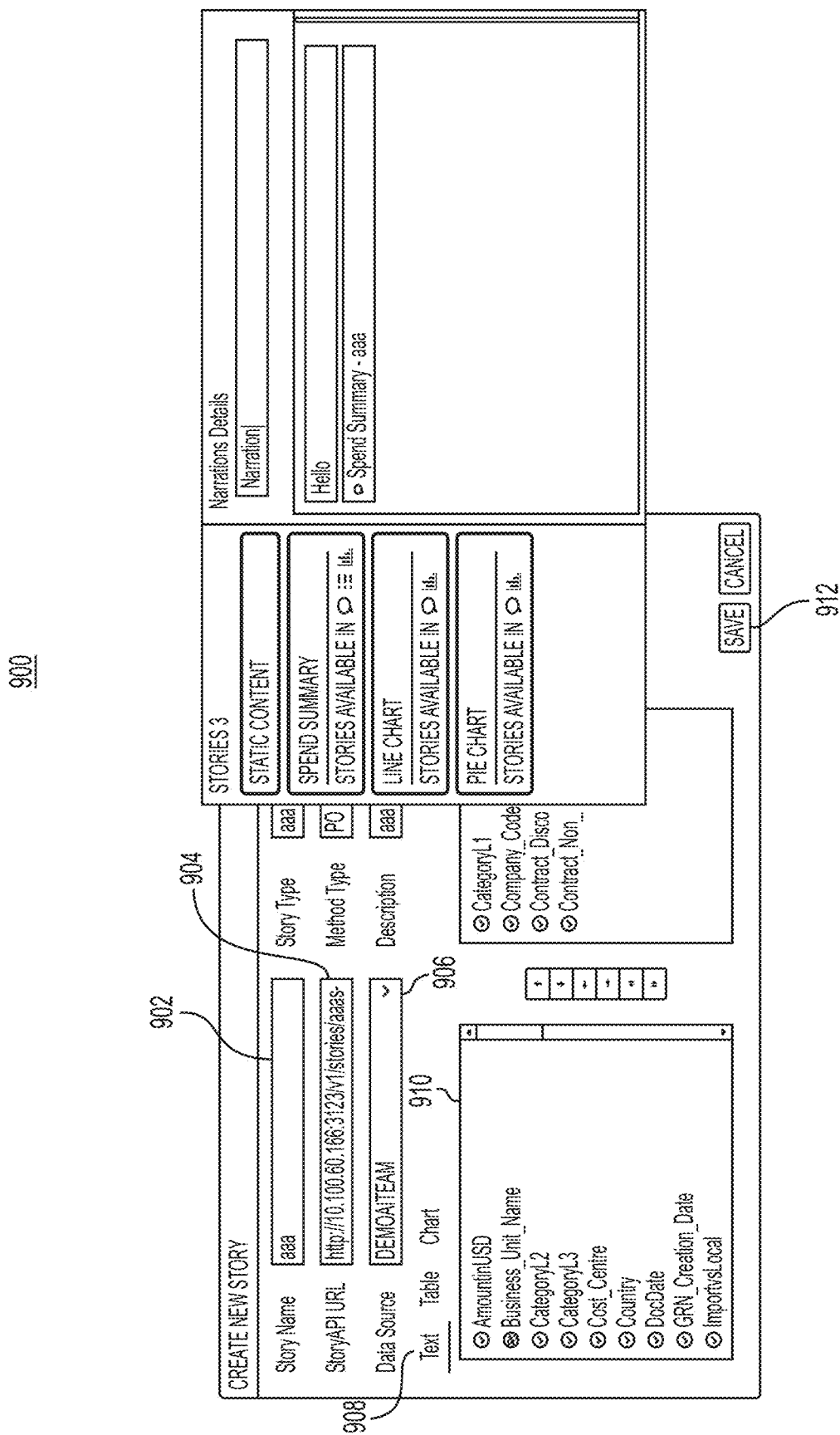
FIG. 9 shows an example of a configuration user interface (UI) that enables an administrative user to enter configuration input for the generation of a data narration.

Various user interfaces such as the input/output GUI 422, the data narrations and configuration screens for providing the data 120 and/or the configuration input 140 used by the narration generating system 100 are discussed below. FIG. 9 shows an example of a configuration UI 900 that enables an administrative user to enter configuration input for the generation of a data narration. The configuration UI 900 allows the administrative user to enter the name of the story/data narration 902, the story universal resource locator (URL) 904 and the data source 906 from which the data for the data narration is to be accessed. One of the plurality of formats 908 for the data narration including the textual format, the tabular format or the chart/graphical format can be selected. Furthermore, particular data fields or columns for the data source 906 can be further selected at 910. Clicking the save 912 button generates a data narration in accordance with the configuration input provided by the user via the configuration UI 900.

FIG. 10 illustrates some data 1002 and snippets 1, 2 and 3 in textual format conveying the information from the data 1002 in accordance with the examples disclosed herein. In an example, the snippets 1, 2 and 3 can be generated by different models. The snippet 1 includes numerous repetitions of the same words and hence may score low in the automatic selection process. Although certain repetitions persist in the snippet 2, the snippet 2 improves upon the snippet 1 and may therefore score higher than the snippet 1. Finally, the snippet 3 scores the highest as it does not include repetitions and is the closest to a natural language based summary. Therefore, snippet 3 can be automatically selected for inclusion into a data narration.

Figure 11:
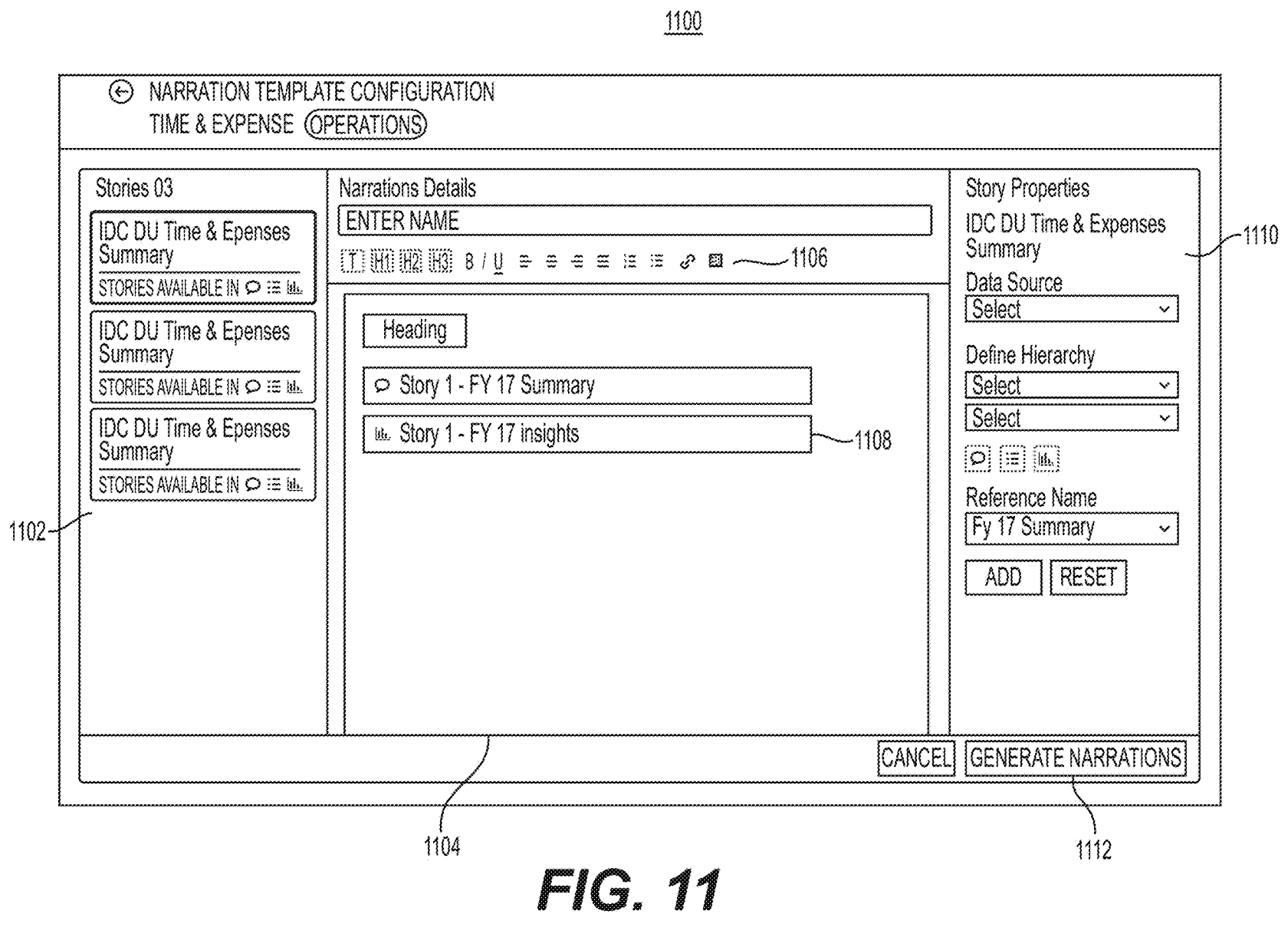

FIG. 11 shows an output GUI in the form of a drag-and-drop UI 1100 that enables a user to generate the data narration 130 from the plurality of snippets 132-*a* . . . 132-*b* in accordance with the examples disclosed herein. The drag-and-drop GUI 1100 includes a snippet selection area 1102 for enabling user selection of the snippets to be included in the data narration 130 via drag-and-drop operations. The narration detail area 1104 enables the user to arrange the selected snippets in order in which they are to appear in the data narration 130. In addition, the narration detail area 1104 allows the user to set the formatting details via a toolbar 1106. As the user drags and drops an icon for a snippet 1108 from the snippet selection area 1102 to the narration detail area 1104, a link to the snippet can be added to the narration template in order to generate the data narration. The details regarding the snippet are shown in the properties area 1110. The properties of the narration such as the data source, hierarchy etc. can be changed from the properties area. Upon assembling the links to the snippets to be included in the data narration 130, the user can click the generate narration button 1112 for generating the data narration 130.

Figure 12:
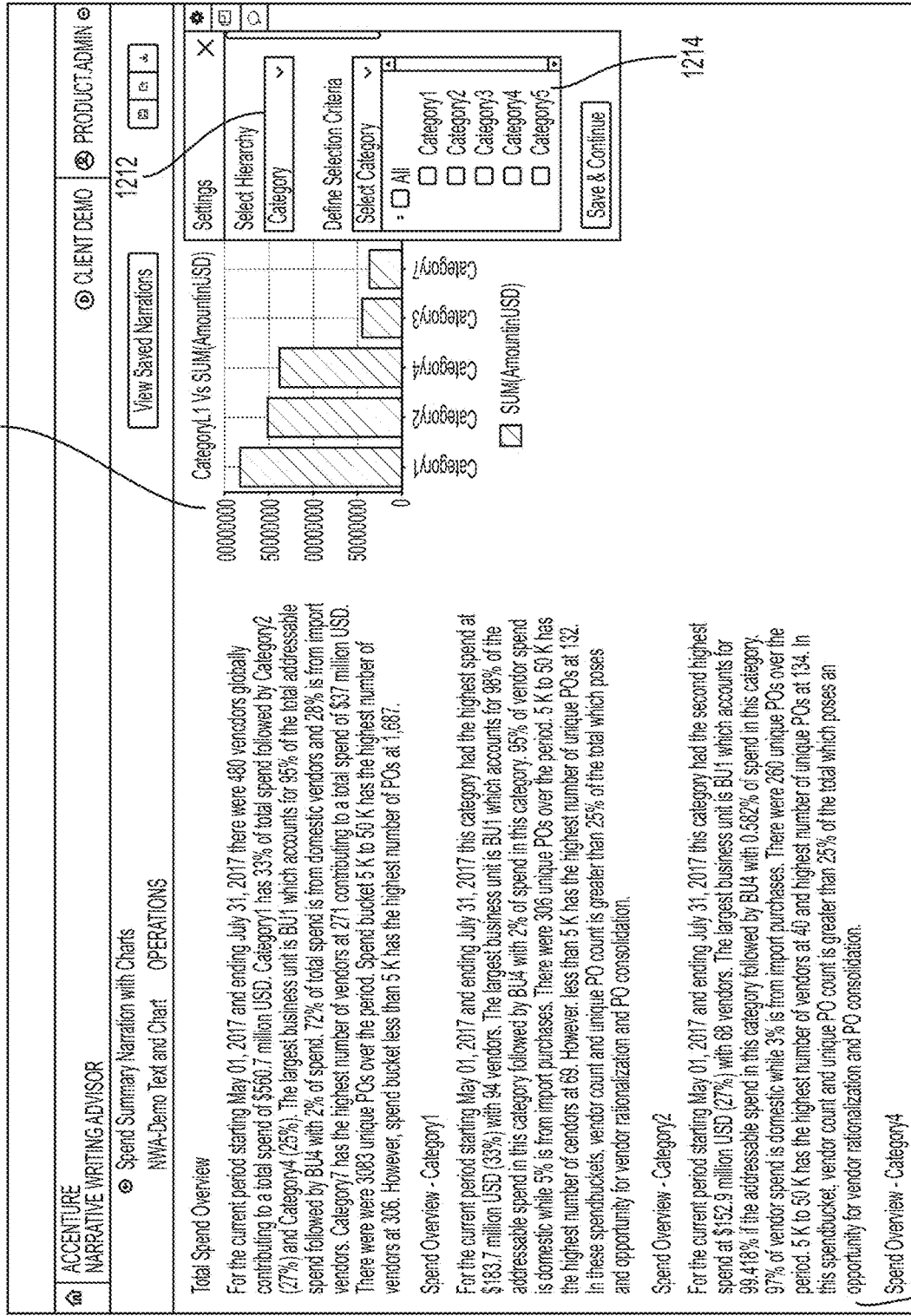
FIG. 12 shows an example data narration that is generated in accordance with methods disclosed herein.

FIG. 12 shows an example data narration 1200 being generated in accordance with methods disclosed herein. The data narration 1200 includes multiple snippets—a snippet in the textual format 1202 and a snippet in the graphical format 1204. In addition, a permissions box 1208 enables the user generating the data narration 1200 to set permissions for the various user hierarchies 1212 for each of the categories 1214. Therefore, each user role or profile in the hierarchy can be mapped to one or more of the categories 1214.

FIG. 13 illustrates a computer system 1300 that may be used to implement the narration generating system 100. More particularly, computing machines such as desktops, laptops, smartphones, tablets, wearables which may be used to generate or access the reports may have the structure of the computer system 1300. The computer system 1300 may include additional components not shown and that some of the components described may be removed and/or modified.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer readable medium 1306 may be any suitable medium which participates in providing instructions to the processor(s) 1302 for execution. For example, the computer readable medium 1306 may be a non-transitory medium or a 910 non-volatile medium, such as a magnetic disk or solid-state non-volatile memory or volatile medium such as RAM. The instructions or modules stored on the computer readable medium 1306 may include machine readable instructions 1364 executed by the processor(s) 1302 and cause the processor(s) 1302 to perform the methods and functions of the narration generating system 100.

The narration generating system 100 may be implemented as software stored on a non-transitory computer readable medium and executed by one or more processors. For example, the computer readable medium 1306 may store an operating system 1362, such as MAC OS, MS WINDOWS, UNIX, or LINUX, and code 1364 for the narration generating system 100. The operating system 1362 may be multi-user, multiprocessing, multitasking, multithreading, real-time and the like. For example, during runtime, the operating system 1362 is running and the code for the narration generating system 100 is executed by the processor(s) 1302.

The computer system 1300 may include a data storage 1310, which may include non-volatile data storage. The data storage 1310 stores any data used by the narration generating system 100. The data storage 1310 may be used to store data used in the narration generation processes for the creation of the snippets, storing user privileges, narration templates etc.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based data narration generating system comprising:
   at least one processor;
   a non-transitory computer readable medium storing machine-readable instructions that cause the at least one processor to:
   access one or more data sources to be used for generating a narration, wherein the narration includes a presentation of data from the one or more data sources in one or more of a plurality of formats;
   select columns from the data that are to be included in the narration from the data sources based on an input from an administrative user;
   provide the data to a plurality of machine learning (ML) models trained in generation of one or more snippets, wherein each snippet includes a presentation of at least a subset of the data in one of the plurality of formats;
   determine based at least on corresponding data types of each of the columns, summarization and aggregation attributes of data in the columns;
   enable generation of a plurality of the snippets by at least a subset of the plurality ML models in one or more formats of the plurality of formats that correspond to the subset of ML models generating the snippets;
   automatically select at least a subset of the plurality of the snippets via a voting process for presentation to the administrative user, wherein the automatic selection is based at least on quality of data including the summarization and the aggregation attributes of the data in the columns;
   enable presentation of the selected subset of snippets to the administrative user via an input/output graphical user interface (GUI);
   receive selection of one or more snippets by the administrative user from the subset of snippets; and
   generate the narration including the user selected snippets arranged in accordance with an order as received from the administrative user.

2. The narration generating system of claim 1, further comprising instructions that cause the processor to:
   access training data for training the plurality of ML models in generating the snippets, wherein the training data includes different data sets and corresponding snippets that present the data sets in a preferred one of the plurality of formats.

3. The narration generating system of claim 1, further comprising instructions that cause the processor to:
   enable the administrative user to provide access to the data narration to one or more end users based on privileges mapped to profiles of the end users.

4. The narration generating system of claim 3, wherein the instructions for enabling the administrative user to provide access to the narration to one or more end users further comprising instructions that cause the processor to:
   provide access to views of the data narration to the end users, wherein the views provided to the end users include corresponding portions of the data that the end users are permitted to view based on the privileges.

5. The narration generating system of claim 1, further comprising instructions that cause the processor to:
   collect feedback from the administrative user and end users for the narration.

6. The narration generating system of claim 1, wherein the plurality of formats include a textual format, a data structure format and a graphical format.

7. The narration generating system of claim 6, wherein the instructions for automatically selecting at least a subset of the plurality of the snippets further comprising instructions that cause the processor to:
   enable generation of at least one of the plurality of the snippets by each of the plurality ML models in one of the plurality of formats.

8. The narration generating system of claim 7, wherein the instructions for automatically selecting at least the subset of the plurality of the snippets further comprising instructions that cause the processor to:
   automatically select the subset of the plurality of the snippets based on quality of the data, volume of the data and the voting process based on user feedback.

9. The narration generating system of claim 1, wherein a textual format includes a natural language summary obtained from the data that is to be included in a corresponding snippet.

10. The narration generating system of claim 1, wherein the plurality of ML models include recurrent neural network (RNN), Key Press Markup Language (KPML) and simplenlg.

11. A method of generating data narrations, comprising:
    selecting data that is to be included in a data narration from one or more data sources, the selection of data is based on an input from an administrative user and the data narration includes a presentation of data from the one or more data sources in one or more of a plurality of formats;
    providing the data to a plurality of machine learning (ML) models trained in generation of a plurality of snippets, wherein each snippet includes a presentation of at least a subset of the data in one of the plurality of formats;
    determining, by each of the plurality of ML models, a subset of the data to be included in the snippets and one of the plurality of formats of presenting the subset of the data in the snippets;
    determining based at least on corresponding data types of each of the columns, summarization and aggregation attributes of data in the columns;
    enabling generation of each of the plurality of the snippets by at least one ML model of the plurality ML models in a format of the plurality of formats that correspond to the ML model generating the snippet;
    automatically selecting at least a subset of the plurality of snippets for presentation to the administrative user via an input/output graphical user interface (I/O GUI), the automatic selection based on a quality of the data, quantity of the data and a voting mechanism wherein the quality of data includes the summarization and the aggregation attributes of the data in the columns;
    receiving selection of one or more of the subset of snippets by the administrative user via the output GUI;
    generating the data narration including the user selected snippets arranged in accordance with an order as received from the administrative user; and
    enabling access to the narration to a plurality of end users based on respective user profiles of the end users, wherein the user profiles determine one or more of the user selected snippets that are displayed to each of the end users in the data narration.

12. The method of claim 11, further comprising:
including, within the data narration, the voting mechanism that enables the end users to provide feedback to the data narration.

13. The method of claim 11, wherein automatically selecting at least the subset of the plurality of snippets further comprising:
automatically selecting at least a subset of the plurality of snippets based on historical feedback received from the end users to prior narrations.

14. The method of claim 11, wherein automatically selecting at least the subset of the plurality of snippets further comprising:
accessing configuration input from the administrative user regarding a number of snippets to be automatically selected; and
selecting, based on the configuration input, a highest scoring snippet of the plurality of snippets for presentation via the output GUI.

15. The method of claim 11, wherein receiving the selection of the subset of snippets further comprising:
receiving, via drag-and-drop operations, selection of one or more of the subset of snippets by the administrative user via the output GUI.

16. The method of claim 11, further comprising:
enabling, the administrative user to edit the data to be included in the narration.

17. A non-transitory computer-readable storage medium comprising machine-readable instructions that cause a processor to:
access one or more data sources to be used for generating a narration, wherein the narration includes a presentation of data from the one or more data sources in one or more of a plurality of formats;
select columns from the data that are to be included in the narration from the data sources based on an input from an administrative user;
provide data from the selected columns to a plurality of machine learning (ML) models trained in generation of one or more snippets, wherein each snippet includes a presentation of at least a subset of the data in one of the plurality of formats;
determine, by each of the plurality of ML models, summarization and aggregation attributes of data in the columns;
enable generation of a plurality of the snippets by at least a subset of the plurality ML models in one or more corresponding formats of the plurality of formats based on the summarization and aggregation attributes of the data in the columns;
automatically select at least a subset of the plurality of snippets via a voting process for presentation to the administrative user via an output graphical user interface (GUI), wherein the automatic selection is based at least on quality of data including the summarization and the aggregation attributes of the data in the columns;
enable presentation of the selected subset of snippets to the administrative user via the output GUI;
receive selection of one or more snippets by the administrative user from the subset of snippets; and
generate the narration including the user selected snippets arranged in accordance with an order as received from the administrative user.

18. The non-transitory medium of claim 17, wherein the instructions for to enable generation of a plurality of the snippets by the plurality ML models further comprising instructions that cause the processor to:
transmit an output including the summarization and aggregate attributes of data in the columns to one or more Application Programming Interfaces (APIs), wherein the APIs include textual API, graph APIs and data structure API.

19. The non-transitory medium of claim 17, further comprising instructions that cause the processor to:
receive a request from a device associated with an end user for access to the data narration; and
determine data that is permissible for viewing by the end user based on a profile associated with the end user.

20. The non-transitory medium of claim 19, further comprising instructions that cause the processor to:
generate permissible snippets including the data that is permissible for viewing by the end user, the permissible snippets form a subset of the plurality of snippets; and
generate the data narration including the permissible snippets.

* * * * *